Figures 1, 2, 3:
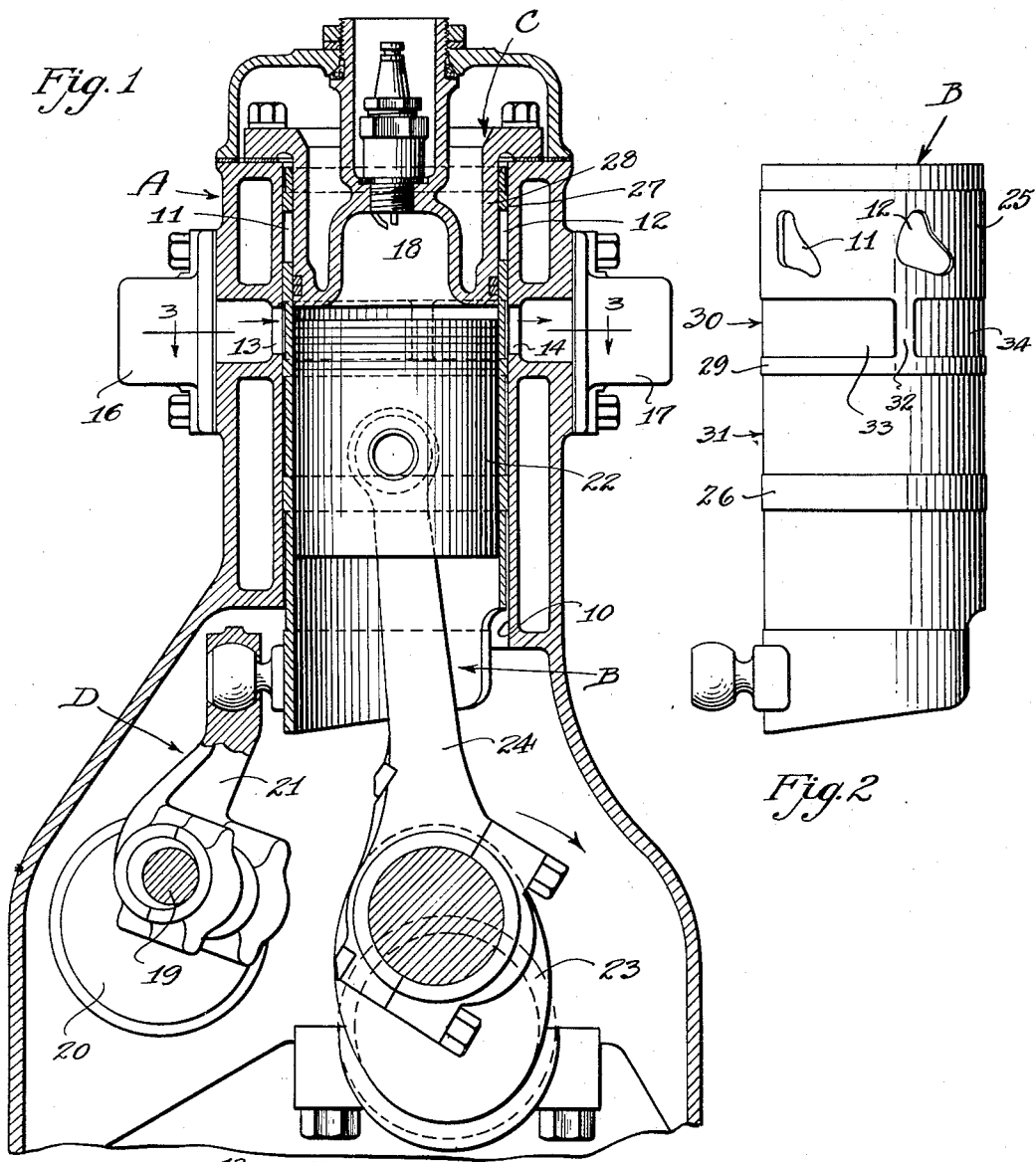

July 25, 1933.   A. J. MEYER   1,919,476
ENGINE
Original Filed Oct. 5, 1931

INVENTOR.
Andre J. Meyer
BY
ATTORNEY.

Patented July 25, 1933

1,919,476

UNITED STATES PATENT OFFICE

ANDRE J. MEYER, OF DETROIT, MICHIGAN, ASSIGNOR TO CONTINENTAL MOTORS CORPORATION, OF DETROIT, MICHIGAN, A CORPORATION OF VIRGINIA

ENGINE

Application filed October 5, 1931, Serial No. 566,927. Renewed July 27, 1932.

My invention relates to internal combustion engines and refers more particularly to the sleeve valve types of engines as distinguished from poppet valve engines. More specifically my invention provides improved methods and constructions relating to the Burt-McCollum type of single sleeve valve engine in which the sleeve is given a combined axial reciprocation and oscillation in accomplishing the porting and other cycles of the engine performance, but I desire it understood that my improvements are for the most part equally adaptable to other types of engines than the single sleeve type as will be more apparent from my disclosure.

Heretofore considerable difficulty has been experienced in fitting the sleeve valve or valves to the parts associated therewith, usually within the cylinder, to maintain a gas seal sufficient to permit relatively high explosion pressures without attendant friction losses. In other words, when the sleeve is fitted relatively tight or close (such as .0015 inches clearance with the cylinder for example) to maintain the desired seal for the development of high pressures and to prevent excessive oil pumping and carbonizing in the combustion chamber, then under such conditions the resulting friction due to the tight fit over the sleeve length increases the friction loss in the engine often to the point where it negatives the advantages derived from the tight fit. On the other hand when the sleeve is fitted relatively loosely (such as .004 clearance with the cylinder for example) the power developed by the engine increases owing to the reduced friction loss but such increase is offset by gas loss during explosion and by the attendant disadvantages of oil pumping past the sleeve with carbonization in the combustion chamber.

In reference to the single sleeve engine of the aforesaid combined movement type I have discovered that the sleeve tends to bear against the cylinder principally in the vicinity of the cylinder ports (where such zone is subjected to the peak explosion pressures) and near the bottom of the cylinder. The sleeve with customary valving for the engine described is ordinarily oscillating at the top of its stroke during the peak pressure development and such pressure tends to expand the sleeve at the cylinder port zone, the sleeve bearing principally at such times at said zone and at a second zone adjacent the bottom of the cylinder, this being emphasized with a wobble type drive such as illustrated herein.

It is an object of my invention to provide improved methods and constructions for the sleeves and cylinders whereby I am enabled to retain the tight gas seal at the cylinder ports with attendant increased engine power and without carbonization in the combustion chamber and at the same time to minimize the friction losses so as to actually realize the aforesaid advantages in the net performance of the engine. I accomplish this specifically by providing a clearance between the sleeve and cylinder at the zone of sleeve exposure to peak pressures whereby friction losses at this point are minimized, the sleeve being provided with spaced bands of a diameter sufficient to tightly engage the cylinder, whereby the sleeve friction is localized to provide relatively high pressure intensity thereby reducing the coefficient of friction and the total friction loss. At the same time the sleeve is given a clearance with the cylinder at the zone of maximum gas pressure whereby usual friction losses experienced by sleeve expansion under such pressure are eliminated.

Difficulty has been experienced with the employment of a sleeve of the type as described above due to the fact that communication was established between the cylinder intake and exhaust ports around the sleeve and because of the differential of pressures in the intake and exhaust manifolds, a flow of exhaust gas from the exhaust chamber to the intake chamber resulted, which picked up the oil between the sleeve and cylinder and carried it into the intake chamber, thus resulting in a smoky engine due to imperfect combustion of the oil introduced into the combustion chamber.

Another object of my invention is to eliminate the above mentioned difficulties by providing a construction that shuts off the communication between the cylinder intake and exhaust ports at the time the clearance between the sleeve and cylinder in the vicinity of the cylinder ports is a maximum.

Further objects and advantages of my invention will be apparent as this specification progresses, reference being made to the accompanying drawing in which:

Fig. 1 is a sectional elevation view of a typical engine cylinder for a representative sleeve valve engine showing my invention incorporated therewith, Fig. 2 is an elevation view of the sleeve valve, and, Fig. 3 is a horizontal sectional view through the engine in the plane of the cylinder ports and taken substantially on the line 3—3 of Fig. 1.

In the drawing reference character A represents an engine and for purposes of illustration this engine is shown as the Burt-McCollum type as aforesaid, the sleeve valve B moving in cylinder 10 to cause intake ports 11 and exhaust ports 12 thereof to perform the usual valving functions with cylinder intake and exhaust ports 13 and 14 respectively. Intake and exhaust manifolds 16, 17 respectively communicate with the cylinder ports 13, 14. The cylinder is closed by the usual cylinder head assembly C of the reentrant type providing the combustion chamber 18. The sleeve is moved by a suitable driving mechanism D illustrated as a wobble crank 19 carried by the valveshaft 20 driven at half engine crankshaft speed for the usual four stroke cycle, the wobble crank 19 being connected to the sleeve by the sleeve link 21. Within the sleeve B is located the usual piston 22 operating crankshaft 23 by the connecting rod 24.

Referring particularly to Fig. 2 it will be noted that the sleeve B has a band 25 forming a bearing portion and extending circumferentially around the sleeve preferably containing the sleeve intake and exhaust ports 13, 14, this band extending axially of the sleeve sufficiently beyond the ports to provide sufficient gas seal therefor, as for example ¼ of an inch in the illustration. The sleeve is provided with another bearing portion 26 spaced axially below the bearing portion 25, said portions 25 and 26 being generally referred to as upper and lower cylinder bearing portions. Preferably this lower bearing portion is of less width than the upper bearing portion and is arranged preferably for operation in the vicinity of the lower or inner portion of the engine cylinder while the upper bearing portion is arranged for operation preferably in the vicinity of the cylinder ports and in the sleeve pocket 27 above the ports formed by the reentrant portion 28 of the cylinder head C. A third bearing portion 29 is located between the upper and lower bearing portions, this intermediate bearing portion being spaced axially from the upper and lower bearing portions and preferably arranged so as to lie just below the cylinder ports when the sleeve is in its uppermost position of travel. Preferably the bearing portion 29 is spaced from the bearing portion 25 a distance substantially the same or slightly less than the vertical travel of the sleeve so as to only slightly overlap that portion of the cylinder engaged by the bearing portion 25. The sleeve portions intermediate the axially spaced bearing portions are of less diameter than the bearing portions to provide clearance between the sleeve and cylinder. Thus I provide cylinder clearance portions 30 and 31 respectively intermediate upper and intermediate bearing portions and the intermediate and lower bearing portions.

As an illustration of typical sleeve and cylinder fits which I have found adaptable for accomplishing the objects of my invention, I may fit zones 25, 26, and 29 within cylinder 10 with .002 of an inch clearance and even less, the remaining portions of the sleeve preferably being free from contact with the cylinder. In this manner much of the friction losses of the engine may be eliminated to produce useful delivered horsepower output. It will be observed that in Fig. 1 with the crankshaft moving clockwise as indicated by the arrow the expansion or combustion cycle is approximately just commencing and the intake gases being compressed for firing. The piston 22 is approximately located at or near top or outer dead center and the band or zone 25 is projected upwardly in the sleeve pocket whereby the sleeve portion 30 will be positioned opposite the cylinder ports 13, 14. Thus, the peak pressures developed by the combustion in chamber 18 act outwardly within the sleeve at portions thereof having sufficient clearance with the cylinder to prevent friction losses between the sleeve and cylinder during explosion. Furthermore, by reason of the bearing sleeve zones 25, 26 and 29 being a relatively small proportion of the total sleeve area the friction loss due to sleeve movement is greatly reduced and the sleeve bearing provided where it will act most efficiently. By reason of my invention I am enabled to provide unusually close fits between the cylinder and sleeve at the sleeve ports in order to realize an efficient gas seal with improved power output and without objectionable oil pumping and carbonization in the combustion chamber.

By way of further illustration I have formed the zones 25 and 29 with .0005 of an inch clearance with the cylinder, where the cylinder bore is about 3½ inches in diameter, with approximately .002 of an inch clearance for the zones 30 and 31. The clearance for the latter zones should not exceed approximately .002 of an inch since substantially this amount is necessary to maintain a film of oil of ordinary quality between the cylinder and the walls of zones 30 and 31. By maintaining an oil film I not only obtain the desired amount of lubrication but also provide for heat transfer from the combustion chamber to the sleeve valve and thence to the cylinder. It is desirable to provide as much clearance for zones 30 and 31 as is feasible without breaking down the oil film at said zones, thereby realizing the fullest benefits of my invention resulting from the clearance zones and zones of relatively tight fit with the cylinder.

I have devised means preventing passage of exhaust gases from the exhaust manifold to the intake manifold when the recessed portion of the sleeve, which provides clearance between the sleeve and cylinder, is located in the vicinity of the cylinder intake and exhaust ports. This is preferably accomplished in the illustrated embodiment of my invention by providing a vertical land portion 32 extending parallel to the sleeve axis and connecting the sleeve bearing portions 25 and 29, said connecting land portion preferably constructed flush with the outer bearing surface of said bearing portions. Thus, the land portion or strip 32 divides the sleeve clearance portion 30 between the bearing portions 25 and 29 into non-communicating segmental recesses or zones 33 and 34 which are thus spaced circumferentially of the sleeve by the land portions 32 and adapted to respectively communicate with the cylinder intake and exhaust ports 13 and 14, when said clearance portion is located in the vicinity of said cylinder ports as shown in Fig. 1.

It may be further noted (see Fig. 3) that the recessed zones 33 and 34 form non-communicating segmental clearance portions, circumferentially spaced around the sleeve and are located generally in the same horizontal plane perpendicular to the sleeve axis so as to be especially adapted for cooperative assembly with an engine of the single sleeve valve type. It may be further noted, that the recessed segmental zone 33 communicates with a group of cylinder intake ports 13, while the recessed segmental zone 34 communicates with a group of cylinder exhaust ports 14, and in the arrangement herein illustrated the zone 33 extends around more than half of the sleeve, the segmental recessed zone extending through an arc of more than 180 degrees of the sleeve circumference while the segmental recessed zone extends through an arc of less than 180 degrees.

It will be noted that these segmental recessed clearance zones only communicate with the cylinder ports during a portion of the sleeve travel and land portion 32 being so constructed as to cooperatively engage the cylinder wall portions 35 intermediate the groups of cylinder intake and exhaust ports during such time as the clearance zone is located in the vicinity of the cylinder ports.

In conclusion, it will be noted that the herein described construction retains the most beneficial results obtainable by the use of a sleeve having a minimum amount of bearing surface with the cylinder, without any of the objectionable effects resulting from circulation of the exhaust gas from the exhaust manifold to the intake manifold around the sleeve, since this passage is effectively blocked by the land portion 32.

Although I have illustrated but one form of my invention and have described in detail but a single application thereof, it will be apparent to those skilled in the art to which my invention pertains that various modifications and changes may be made therein without departing from the spirit of my invention or from the scope of the appended claims.

What I claim as my invention is:

1. An engine of the sleeve valve type including a cylinder and associated piston, a sleeve valve, said sleeve and cylinder having cooperative intake and exhaust ports, said sleeve having a diameter at its ports greater than its diameter adjacent thereto, and means cooperating with the sleeve portion of lesser diameter for preventing communication between the cylinder intake and exhaust ports around the sleeve.

2. An engine of the sleeve valve type including a cylinder and associated piston, a sleeve valve, said sleeve and cylinder having cooperating intake and exhaust ports, said sleeve having a diameter at its ports greater than its diameter adjacent thereto, and means dividing said sleeve portion of lesser diameter into non-communicating zones respectively communicating with the cylinder intake and exhaust ports whereby to prevent communication between said ports when said sleeve portion of lesser diameter is located in the vicinity of said ports.

3. An engine of the sleeve valve type including a cylinder and associated piston, a sleeve valve, said sleeve and cylinder having cooperating intake and exhaust ports, said sleeve having a bearing portion cooperating with the cylinder and a clearance portion substantially surrounding the sleeve, and means for dividing said clearance portion into non-communicating zones respectively communicating with the cylinder intake and exhaust ports during a portion of the sleeve movement.

4. An engine of the sleeve valve type including a cylinder and associated piston, a sleeve valve, said sleeve and cylinder having cooperating intake and exhaust ports, said sleeve having spaced bearing portions of enlarged diameter relative to intermediate portions of said sleeve, one of said enlarged portions containing said sleeve ports, said intermediate sleeve portion providing a clearance portion substantially surrounding the sleeve and means for dividing said clearance portion into non-communicating zones respectively communicating with the cylinder intake and exhaust ports during a portion of the sleeve movement.

5. An engine of the sleeve valve type including a cylinder and associated piston, a sleeve valve, said sleeve and cylinder having cooperating intake and exhaust ports, a piston operable within said sleeve, said sleeve having a clearance portion substantially free from contact with said cylinder and exposed to the peak pressures developed during engine combustion, and means for dividing said clearance portion into non-communicating zones respectively communicating with the cylinder intake and exhaust ports during such time as said sleeve is exposed to peak pressures.

6. An engine of the sleeve valve type including a cylinder and associated piston, a sleeve valve, said sleeve and cylinder having cooperating intake and exhaust ports, a piston operable within said sleeve, said sleeve having a clearance portion substantially free from contact with said cylinder as to those sleeve portions exposed to the peak pressures developed during engine combustion and means dividing said clearance portion into non-communicating zones whereby establishment of communication between the cylinder intake and exhaust ports is prevented during such time as said zones are respectively communicating with the cylinder intake and exhaust ports.

7. In a sleeve valve engine having a cylinder provided with intake and exhaust ports located substantially in a plane transverse to the cylinder axis, a single tubular sleeve valve within the cylinder, a piston within said sleeve, said sleeve having an annular bearing portion cooperating with said cylinder and provided with intake and exhaust ports extending therethrough, said sleeve having a clearance portion adjacent to said annular bearing portion and surrounding the sleeve, and means for dividing said clearance portion into non-communicating zones respectively communicating with the cylinder intake and exhaust ports whereby establishment of communication between said cylinder ports is prevented when said clearance portion is located in the vicinity thereof.

8. An engine of the sleeve valve type comprising a cylinder and associated piston, a sleeve valve, said sleeve and cylinder having cooperating intake and exhaust ports, means providing circumferentially spaced segmental clearance portions between the sleeve valve and the cylinder at the portion of the latter adjacent the engine explosion chamber, said sleeve bearing in said cylinder.

9. A sleeve valve ported for intake and exhaust and adapted for cooperation with an engine cylinder, said sleeve valve having circumferentially spaced segmental recesses providing clearance with the cylinder.

10. A sleeve valve ported for intake and exhaust and adapted for cooperation with an engine cylinder, said sleeve valve having circumferentially spaced segmental recesses providing clearance with the cylinder and located generally in a transverse plane extending perpendicular to the sleeve axis.

11. A sleeve valve ported for intake and exhaust and adapted for cooperation with an engine cylinder having a group of exhaust ports and a group of intake ports, said sleeve valve having circumferentially spaced segmental recesses each providing non-communicating clearance zones with the cylinder, one of said zones cooperating with the group of intake ports while the other zone cooperates with the group of exhaust ports.

12. A sleeve valve ported for intake and exhaust and adapted for cooperation with an engine cylinder, said sleeve valve provided with cylinder bearing portions spaced axially of the sleeve and having circumferentially spaced segmental recesses intermediate said cylinder bearing portions for providing clearance with the cylinder.

13. A sleeve valve ported for intake and exhaust and adapted for cooperation with an engine cylinder having intake and exhaust ports, said sleeve valve provided with a cylinder bearing portion in the region of the ports and with a cylinder clearance portion adjacent to said bearing portion and surrounding the sleeve, and means for dividing said clearance portion into non-communicating clearance zones respectively adapted for communication with the cylinder intake and exhaust ports whereby to prevent communication between said cylinder intake and exhaust ports when said clearance portion is located in the vicinity of said ports.

14. A sleeve valve adapted for cooperative assembly with an engine cylinder and having axially spaced bearing portions and a clearance portion intermediate the bearing portions, and means dividing said clearance portion into circumferentially spaced segmental non-communicating clearance zones.

15. A sleeve valve adapted for cooperative assembly with an engine cylinder and having axially spaced bearing portions and a clearance portion intermediate the bearing portions, said sleeve having land portions connecting said bearing portions for dividing said clearance portion into circumferentially spaced segmental clearance zones.

16. A sleeve valve adapted for cooperative assembly with an engine cylinder and having axially spaced bearing portions and a clearance portion intermediate the bearing portions, said sleeve having land portions extending in a direction parallel to the sleeve axis and constructed for cooperation with the cylinder to form circumferentially spaced segmental recesses providing clearance between the sleeve and cylinder.

17. A sleeve valve ported for intake and exhaust and adapted for cooperative assembly with an engine cylinder, said sleeve valve provided with axially spaced cylinder bearing portions one of which being located in the region of the sleeve ports and extending above and below same, and an intermediate cylinder bearing portion axially spaced from and located intermediate the first said bearing portions for providing axially spaced cylinder clearance portions extending substantially around the sleeve and means for dividing one of said clearance portions into circumferentially spaced segmental cylinder clearance zones.

18. A sleeve valve ported for intake and exhaust and adapted for cooperative assembly with an engine cylinder, said sleeve valve provided with axially spaced cylinder bearing portions one of which being located in the region of the sleeve ports and extending above and below same, and an intermediate cylinder bearing portion axially spaced from and located intermediate the first said bearing portions for providing axially spaced cylinder clearance portions extending substantially around the sleeve and means for dividing one of said clearance portions into circumferentially spaced segmental cylinder clearance zones, one of said segmental cylinder clearance zones extending more than one-half the way around said sleeve.

19. In a sleeve valve engine having a cylinder ported for intake and exhaust, a sleeve valve operable in the engine cylinder and having intake and exhaust ports cooperating with the cylinder ports, said sleeve valve having upper and lower bearing portions surrounding the sleeve and cooperating with the cylinder and an intermediate bearing portion spaced axially from the upper and lower bearing portions, the sleeve portions between said bearing portions being of less diameter than the bearing portions to provide circumferential recesses substantially surrounding the sleeve and providing clearance between the sleeve and engine cylinder, and means dividing the circumferential recess lying between the intermediate and upper bearing portions whereby to provide circumferentially spaced segmental clearance zones respectively communicating with the cylinder intake and exhaust ports during a portion of the sleeve movement.

20. In a sleeve valve engine having a cylinder ported for intake and exhaust, a sleeve valve operable in the engine cylinder and having intake and exhaust ports cooperating with the cylinder ports, said sleeve valve having upper and lower bearing portions surrounding the sleeve and cooperating with the cylinder and an intermediate bearing portion spaced axially from the upper and lower bearing portions, the sleeve portions between said bearing portions being of less diameter than the bearing portions to provide circumferential recesses substantially surrounding the sleeve and providing clearance between the sleeve and engine cylinder, said sleeve having a vertical strip land portion positioned substantially flush with the bearing portions and connecting the intermediate and upper bearing portions whereby to divide the clearance portion therebetween into circumferentially spaced segmental non-communicating clearance zones respectively communicating with the cylinder intake and exhaust ports during a portion of the sleeve movement, substantially as shown in the accompanying drawing and described in the accompanying specification.

21. In a sleeve valve engine having a ported cylinder, a sleeve valve operably associated with said cylinder and having a port cooperating with said cylinder port, said sleeve valve having upper and lower bearing portions substantially surrounding the sleeve and cooperating with the cylinder and an intermediate bearing portion spaced axially from the upper and lower bearing portions, the sleeve having portions between said bearing portions of less diameter than the bearing portions providing clearance between the sleeve and cylinder, whereby to reduce the friction loss between the sleeve and cylinder, said sleeve having a reciprocating movement whereby to successively position one of said sleeve bearing portions and one of said clearance portions opposite said cylinder port.

22. In a sleeve valve engine having a ported cylinder, a sleeve valve operably associated with said cylinder and having a port cooperating with said cylinder port, said sleeve valve having upper and lower bearing portions substantially surrounding the sleeve and cooperating with the cylinder and an intermediate bearing portion spaced axially from the upper and lower bearing portions, the sleeve having portions between said bearing portions of less diameter than the bearing portions providing clearance between the sleeve and cylinder, whereby to reduce the friction loss between the sleeve and cylinder, said sleeve being so constructed and moved whereby said cylinder port is exposed at times to one of said clearance portions, said cylinder port being sealed by the sleeve at all times between normal port opening.

23. In a sleeve valve engine having a ported cylinder, a sleeve valve operably associated with said cylinder and having a port cooperating with said cylinder port, said sleeve valve having an inner bearing portion engageable with the inner region of said cylinder and having an outer bearing portion in the region of said sleeve port, said sleeve valve having an intermediate bearing portion engageable with the cylinder intermediate said cylinder port and said inner region thereof, said sleeve valve having a cylinder clearance portion between said inner bearing portion and said intermediate bearing portion, said sleeve valve having a further clearance portion located outwardly of the sleeve valve from said intermediate bearing portion, said further clearance portion being moved opposite said cylinder port periodically during the engine operation.

24. In a sleeve valve engine having a ported cylinder, a sleeve valve operably associated with said cylinder and having a port cooperating with said cylinder port, said sleeve valve having an inner bearing portion engageable with the inner region of said cylinder and having an outer bearing portion in the region of said sleeve port, said sleeve valve having an intermediate bearing portion engageable with the cylinder intermediate said cylinder port and said inner region thereof, said sleeve valve having a cylinder clearance portion between said inner bearing portion and said intermediate bearing portion, said sleeve valve having a further clearance portion located outwardly of the sleeve valve from said intermediate bearing portion, said further clearance portion being moved opposite said cylinder port periodically during the engine operation, and means for imparting a reciprocating movement to said sleeve valve.

ANDRE J. MEYER.